United States Patent
Hansen et al.

(10) Patent No.: US 8,037,669 B2
(45) Date of Patent: Oct. 18, 2011

(54) BAFFLE BASED BATTERY HOUSING

(75) Inventors: Nicholas Hansen, Columbia, SC (US); Matthew Lambert, Summerville, SC (US)

(73) Assignee: Husqvarna Consumer Outdoor Products N.A., Inc., Augusta, GA (US)

( * ) Notice: Subject to any disclaimer, the term of this patent is extended or adjusted under 35 U.S.C. 154(b) by 92 days.

(21) Appl. No.: 12/431,304

(22) Filed: Apr. 28, 2009

(65) Prior Publication Data
US 2010/0269474 A1 Oct. 28, 2010

(51) Int. Cl.
*A01D 67/00* (2006.01)
(52) U.S. Cl. .......................... 56/320.2; 56/320.1; 56/11.9
(58) Field of Classification Search .................... 56/11.9, 56/320.1, 320.2
See application file for complete search history.

(56) References Cited

U.S. PATENT DOCUMENTS

| | | |
|---|---|---|
| 4,930,300 A | 6/1990 | Benter et al. |
| 5,203,147 A | 4/1993 | Long |
| 5,507,137 A | 4/1996 | Norris |
| 5,606,851 A | 3/1997 | Bruener et al. |
| 5,638,668 A | 6/1997 | Kallevig et al. |
| 5,894,715 A | 4/1999 | Braun et al. |
| 5,910,091 A * | 6/1999 | Iida et al. .................. 56/16.7 |
| RE36,250 E | 7/1999 | Hess et al. |
| 6,758,030 B2 * | 7/2004 | Dettmann .................. 56/11.9 |
| 6,826,895 B2 * | 12/2004 | Iida et al. .................. 56/11.9 |
| 7,805,920 B2 * | 10/2010 | Hurst et al. .................. 56/320.2 |
| 2010/0115901 A1 * | 5/2010 | Hurst et al. .................. 56/2 |

FOREIGN PATENT DOCUMENTS

| | | |
|---|---|---|
| EP | 0803179 | 10/1997 |
| WO | WO 9708936 A1 * | 3/1997 |

* cited by examiner

*Primary Examiner* — Alicia Torres
(74) *Attorney, Agent, or Firm* — Nelson, Mullins, Riley & Scarborough LLP

(57) ABSTRACT

A mower 10 is provided for cutting grass where the mower 10 includes a body 12 with a mower deck 16, a motor 14, a baffle 30, and a battery 52. The mower deck 16 has a downwardly-open interior within which grass is cut. The motor 14 is supported upon the mower deck 16 and supplies a motive force for a mowing operation where the motor 14 includes at least a portion operable by electrical energy. The baffle 30 is located within the interior of the mower deck 16 where the baffle 30 bounds an area within the mower deck 16. The battery 52 is located within the interior of the mower deck 16 and is located within the area bounded by the baffle 30. In another example, the mower deck 16 and the baffle 30 are configured for substantially restraining the movement of the battery 52. In an example method, the battery 52 is installed within a baffle 30 that is secured within an interior of the mower deck 16.

25 Claims, 3 Drawing Sheets

BAFFLE BASED BATTERY HOUSING

BACKGROUND OF THE INVENTION

The present invention relates generally to mowers, and more particularly, to a battery housing within a lawn mower.

It is generally known in the prior art to have a mower that requires an electrical source of energy. Packaging the battery for an electrical lawn mower presents several challenges. The first challenge is to determine a location on the mower that is large enough to contain the battery. A battery can be placed on a handle, but this can be expensive, requires substantial assembly, and the balance of the mower is changed. Using a compartment above the mower deck is only an option when there is sufficient room and requires additional parts and assembly. In the case of many mowers, none of these options are sufficient and therefore a new battery location scheme must be developed.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a mower is provided for cutting grass. The mower includes a body with a mower deck, a motor, a baffle, and a battery. The mower deck has a downwardly-open interior within which grass is cut. The motor is supported upon the mower deck and supplies a motive force for a mowing operation where the motor includes at least a portion operable by electrical energy. The baffle is located within the interior of the mower deck where the baffle bounds an area within the mower deck. The battery is located within the interior of the mower deck and is located within the area bounded by the baffle.

In accordance with another aspect of the present invention, a mower is provided for cutting grass. The mower includes a body with a mower deck, a motor, a baffle, and a battery. The mower deck has a downwardly-open interior within which the grass is cut. The mower deck includes a top surface portion and a side surface portion that extends from a perimeter of the top surface portion. The motor is supported upon the mower deck and the motor supplies a motive force for a mowing operation where the motor includes at least a portion operable by electrical energy. The baffle is mounted underneath the side surface portion of the mower deck within the interior of the mower deck. The baffle bounds an area within the mower deck. The battery is located within the interior of the mower and is located within the area bounded by the baffle. The battery includes a first side portion, a second side portion opposite the first side portion, and at least a third side portion extending between the first side portion and the second side portion. The second side portion of the battery is placed on a first support surface of the baffle. The mower deck is configured for substantially restraining the movement of the first side portion of the battery.

In accordance with another aspect of the present invention, a method is provided for installing a battery within a baffle where the baffle is located within an interior of a mower deck. One of the steps in the method is to provide the mower deck with a downwardly-open interior within which grass is cut. Another step is to install the battery within the baffle. Another step includes securing the baffle within the interior of the mower deck. The baffle is configured for bounding an area within the mower deck such that at least one side portion of the battery is restrained from movement by an underside of the mower deck.

BRIEF DESCRIPTION OF THE SEVERAL VIEWS OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
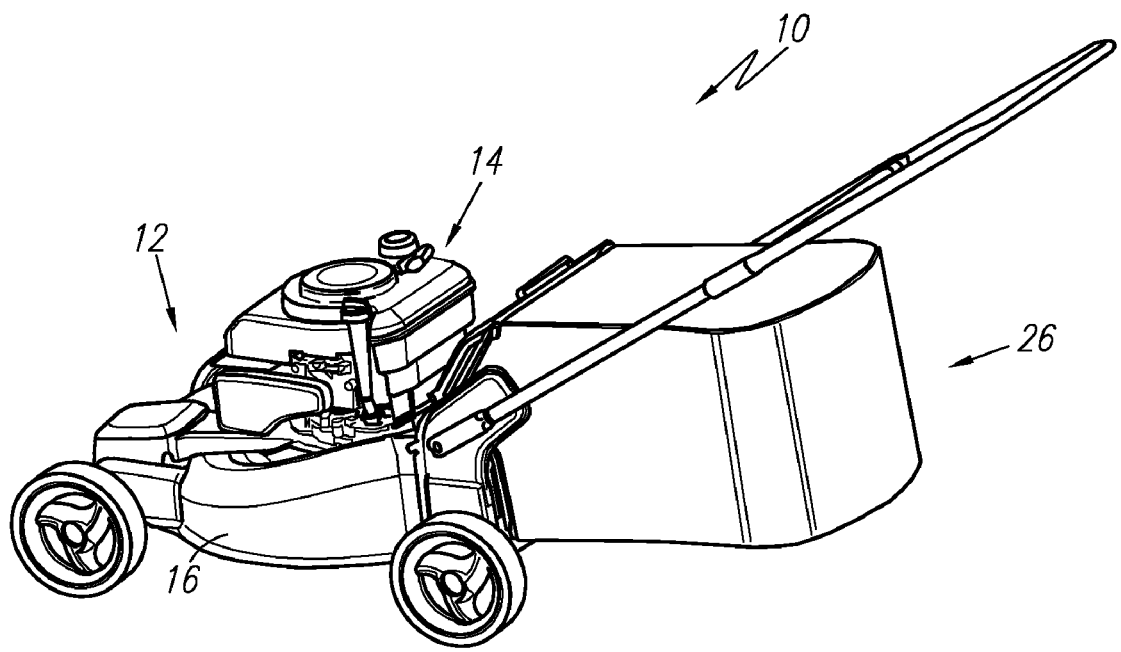
FIG. 1 is a perspective view of an example mower that includes an example of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to the shown example of FIG. 1, an example mower 10 is shown that is configured for cutting grass. The example mower 10 includes a mower body 12 which can include a motor 14 or other power source, a mower deck 16, and a mower blade 24 (shown in FIG. 2). The motor 14 is supported upon the mower deck 16 and the motor 14 supplies a motive force for a mowing operation. At least a portion of the mower 10 is operable by electrical energy, such as by the motor 14 being an electric motor or by providing an electric starter that requires a battery 52 (shown in FIG. 3). The mower 10 of FIG. 1 includes a collection bag 26 to house grass that has been cut, though it is appreciated that a rear or side discharge structure or other type of discharge structure can be used with the subject invention. It is also appreciated that such other configurations of a mower can also be used in association with the subject invention.

Figure 2:
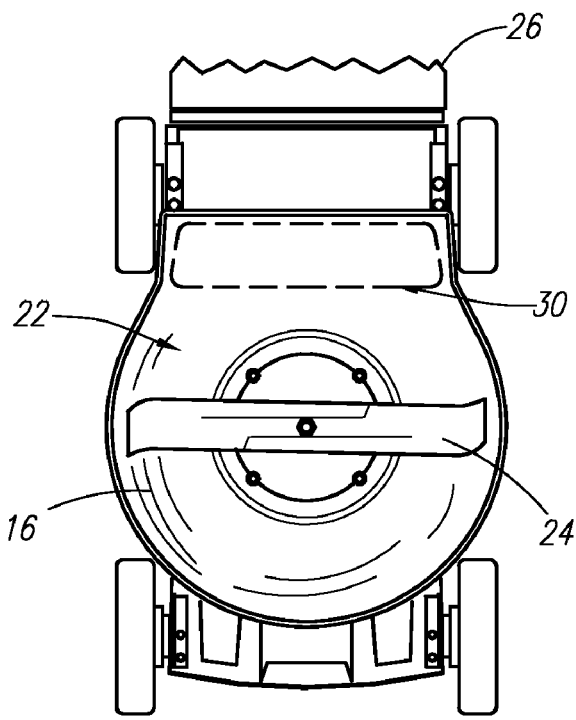
FIG. 2 is a bottom view of the underside of a mower deck of the example mower of FIG. 1.
Figure 3:
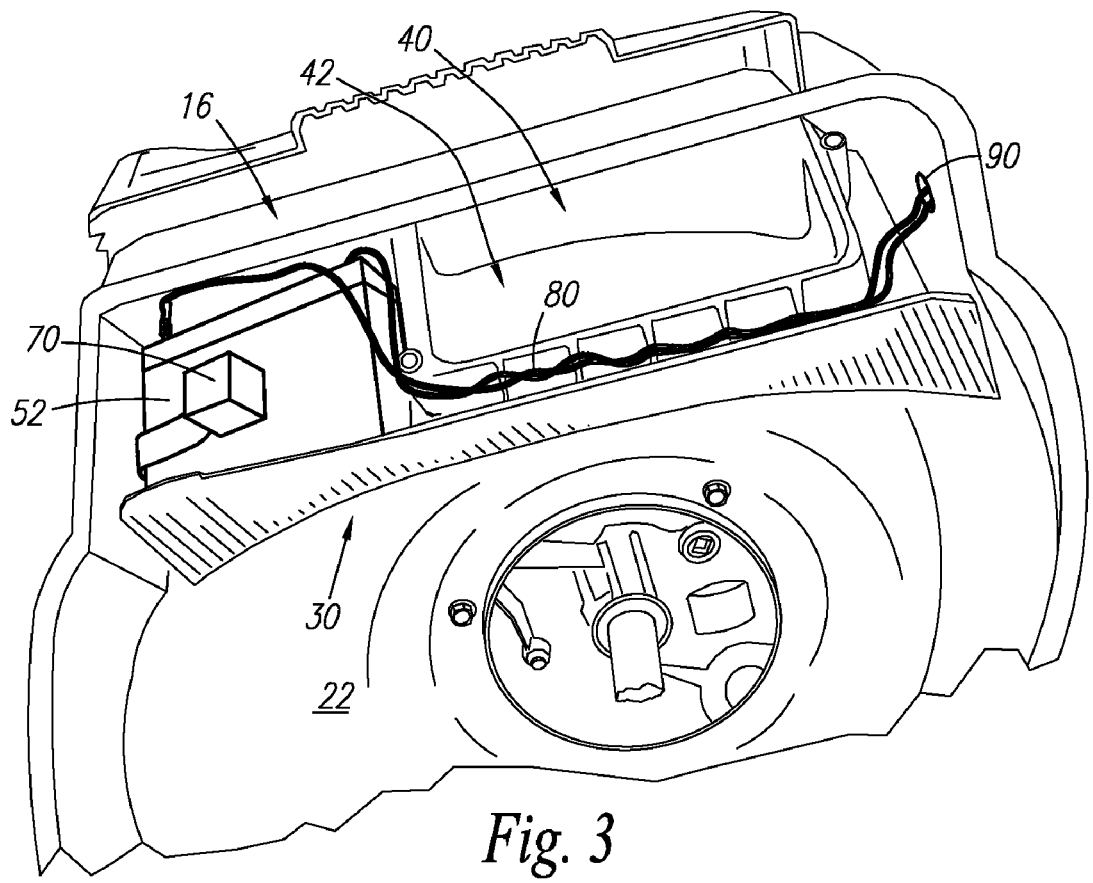
FIG. 3 is a bottom view of a portion of the example mower with an example baffle and a battery within the baffle partially disassembled from the mower deck.

As shown in FIG. 2, the mower deck 16 has a downwardly-open interior 22, located on the underside of the mower deck 16. Within the interior 22, the grass is cut by the mower blade 24. In the shown example, a baffle 30 is located on the underside of the mower deck 16 near the mower blade 24 where a dirty environment exists from debris, grass, and other material that is being cut by the mower blade 24. The baffle 30 provides a battery housing that contains a battery 52, as shown in FIG. 3. The baffle 30 is configured to be mounted to the underside of the mower deck 16 in a location near the mower blade 24 of FIG. 2. The baffle 30 protects the battery 52 from the cut grass and other material that is circulated within the mower blade 24.

In FIG. 3, the baffle 30 is shown displaced or disassembled away from the mower deck 16, which is the position before the baffle 30 is secured to the mower deck 16. The battery 52 can be located within an area bounded by the baffle 30. The mower deck 16 can include a discharge opening 40 that is configured to transport grass clippings into the collection bag 26 of FIG. 1. The baffle 30 can include a baffle opening 42 that corresponds to the discharge opening 40 in the mower deck 16.

Figure 4:
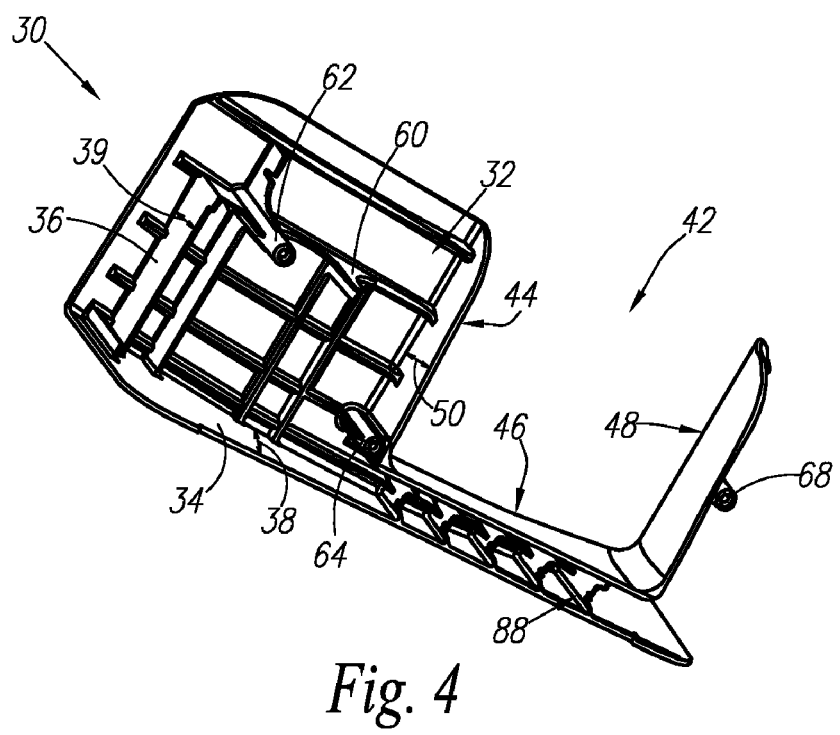
FIG. 4 is a perspective view of the example baffle of FIG. 3.

FIG. 4 shows an example baffle 30 without the battery 52 installed within the baffle 30. The example baffle 30 includes a first support surface 32 that may include reinforcing ribs and that is configured to contact the battery 52. The baffle 30 can further include a second support surface 34 that can be configured to contact a different portion, such as at least one of the side portions of the battery 52. For example, the second support surface 34 can extend at an angle, such as a right angle, from the first support surface 32 such that the battery 52 has two portions that can be substantially restrained from movement. The second support surface 34 can be located on the bottom side of the baffle 30 of FIG. 4, where the second support surface 34 extends at a right angle relative to the first support surface 32.

The baffle 30 can also include a third support surface 36 that extends at an angle relative to the first support surface 32. The third support surface 36 is configured to contact at least one side portion of the battery 52. The third support surface 36, in this example, is located on a left portion of the baffle 30, but in other examples, the third support surface 36 can be located in different portions or along different perimeter edges of the baffle 30. It is appreciated that each support surface can also be configured to contact different portions of the battery 52. In another example, the baffle 30 can also include a fourth support surface that is configured to also contact a side portion of the battery 52. Thus, additional support surfaces can be included with the baffle 30 where the support surfaces are configured to contact portions of the battery 52 to restrain movement of the battery 52 within the baffle 30.

The baffle 30 can further include at least one opening flange on at least one side of a perimeter of the baffle opening 42. The at least one opening flange is configured to protect the battery 52 within the baffle 30 from grass clippings and other debris from the mower blade. The at least one opening flange also can be configured to contact a portion of the battery 52 to restrain movement of the battery 52 within the baffle 30. The at least one opening flange can include a first opening flange 44, a second opening flange 46, and a third opening flange 48. The first opening flange 44 in this example extends in a generally vertical direction. The second opening flange 46 can extend in a generally horizontal direction. The third opening flange 48 can extend in a generally vertical direction.

The baffle 30 can also further include at least one locating protrusion located on the baffle 30 wherein the at least one locating protrusion contacts at least one of the side portions of the battery 52 and wherein the at least one locating protrusion is configured for substantially restraining the movement of at least one side portion of the battery 52. For example, the at least one locating protrusion can include a first locating protrusion 60, a second locating protrusion 62, and a third locating protrusion 64. By providing locating protrusions, the battery 52 can be quickly installed into a proper location within the baffle 30 and can be restrained from movement underneath the mower deck 16. In further examples, a combination of locating protrusions, support surfaces, and/or opening flanges can be provided to each partially restrain movement of the battery 52. In some example baffles, only locating protrusions will be provided, in other examples only support surfaces will be provided, and in further examples only opening flanges will be provided.

In another example, the locating protrusions can be configured to receive a fastener for securing the baffle 30 to the mower deck 16. For example, the second locating protrusion 62 and the third locating protrusion 64 can be configured to receive a fastener for securing the baffle 30 to the mower deck 16. In another example, at least a first fastener aperture 68 can be provided on the baffle 30. A fastener can be inserted through the first fastener aperture 68 to secure the baffle 30 to the mower deck 16. The baffle 30 can be secured to the mower deck 16 through the use of only fastener apertures, or through the use of only locating protrusions, or, alternatively, through a combination of fastener apertures and locating protrusions that are configured to receive a fastener.

In one example, the baffle 30 bounds an area corresponding to the area between the first support surface 32, the second support surface 34, and the mower deck 16. In further examples, the area bounded by the baffle 30 can correspond to the area between at least the first support surface 32, the second support surface 34, the third support surface 36, the first opening flange 44, and at least one locating protrusion, such as the first locating protrusion 60. This example bounds an area on at least five side portions of the battery 52 with the mower deck restraining sixth side portion. In alternative examples, locating protrusions can be placed in various locations to create a bounded area of a different size as well as to create a bounded area for multiple batteries of different shapes and/or sizes. In other examples, the second support surface 34, the third support surface 36, and any other support surfaces can have different orientations relative to the first support surface 32 to create different shaped bounded areas.

Figure 5:
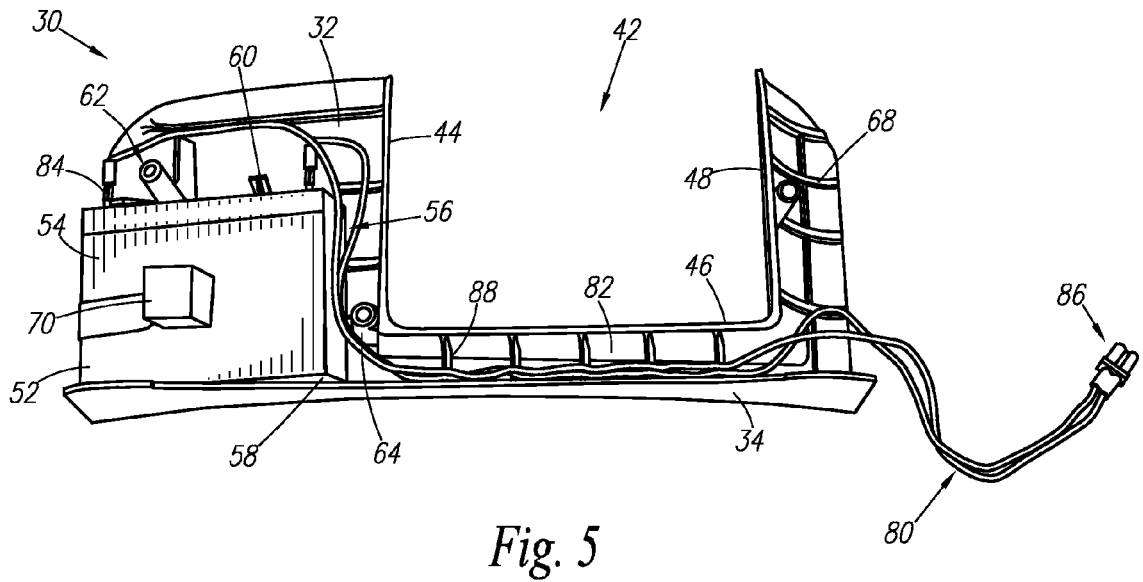
FIG. 5 is a front view of the example baffle of FIG. 4 with a battery located within the baffle.

FIG. 5 shows the baffle 30 with a battery 52 installed within the baffle 30. In other examples, a plurality of batteries can be located within the baffle 30. In further examples, the at least one battery 52 can first be placed within a housing or shell structure and the housing or shell structure can be placed within the baffle 30. The battery 52 in any of the examples can include a plurality of side portions. For example, the battery 52 can include a first side portion 54, a second side portion 56 opposite the first side portion 54, and at least a third side portion 58 extending between the first side portion 54 and the second side portion 56. The second side portion 56 of the battery 52 engages the first support surface 32 of the baffle 30 in this example. The second support surface 34 of the baffle 30 can contact the third side portion 58 of the battery 52. Alternatively, a locating protrusion can be provided to restrain the movement of another side portion of the battery 52, such as in the example of a rectangular battery, any of the four side portions of the battery 52 located between the first side portion and the second side portion. It is appreciated that the first support surface 32 can be located in other locations and can be configured to contact different portions of the battery 52.

Once the baffle 30 is secured to the mower deck 16, the underside of the mower deck 16 is configured for substantially restraining the movement of the first side portion 54 of the battery 52. The first side portion 54 of the battery 52 can engage a protective element 70. The protective element 70, such as a piece of foam or rubber, is configured for absorbing vibration from the mower deck 16 and prevents forces from the mower deck 16 being transmitted to the battery 52. In other examples, other materials that can deform and/or compress or provide protection for the battery 52 can be provided in lieu of selecting foam for the protective element 70. The protective element 70 can be in contact with the mower deck 16 upon final assembly.

A thickness of the battery 52 can be measured between the first side portion 54 of the battery 52 and the second side portion 56 of the battery 52. The thickness of the battery 52 can be relatively less than a depth of the area bounded by the baffle 30. In one example of measuring the depth of the area bounded by the baffle 30, the depth of the area bounded corresponds to a depth measurement 38 of either the second support surface 34 or the depth measurement 39 of the third support surface 36, as shown in FIG. 4. The smaller thickness of the battery 52, relative to the depth of the area bounded by the baffle 30, enables the battery 52 to be placed within the baffle 30 on the underside of the mower deck 16 without causing any increase to the dimensions of the mower deck 16 or the body 12 of the mower. In an alternative example, the first opening flange 44 can have a depth measurement 50 as measured from the first support surface 32 of the baffle 30. The depth measurement 50 of the at least one opening flange can determine the depth of the area bounded by the baffle 30. In any of the examples, the area bounded by the baffle 30 thus enables the battery 52 to be included on the underside of the mower deck 16 without interfering with the mower blade 24.

The battery 52 can further include at least one wire 80 that is configured to transport electrical energy from the battery 52 to another location, such as the motor 14 or the power source for the mower 10. The baffle 30 can provide an internal wiring area that substantially shields the at least one wire 80 from the debris and grass clippings of the mower blade. In one example, the at least one wire 80 travels from a first end 84 at the battery 52 through a channel 82 within the baffle 30, to a second end 86 at a location outside the baffle 30. The channel 82 is the path that the at least one wire 80 passes through within the baffle 30. The channel 82 can be configured to secure a portion of the at least one wire 80 along the channel 82 within the baffle 30. The channel 82 can be located between the at least one opening flange and at least one support surface of the baffle 30. In this example, the channel 82 is located between the second opening flange 46 and the second support surface 34. In other examples, the channel 82 can be located between different support surfaces or between a combination of a support surface and an opening flange. In further examples, the channel 82 can be located on the first support surface 32 of the baffle 30 and extend substantially along the first support surface 32 to a second end 86.

The channel 82 can also further include a securing feature 88, also seen in FIG. 4, which is configured to secure the wire of the at least one wire 80. The securing feature 88 in this example is a V-shaped feature that allows the at least one wire to be easily pressed into a secured location, such as within the channel 82. Other shapes and configurations can be used for the securing feature 88. The channel 86 allows the battery 52 to be located within the mower deck 16 without providing a complicated connecting scheme, adding other parts to the baffle 30 and/or the mower deck 16. Moreover, the channel 86 protects the at least one wire 80 from the grass being cut by the mower blade 24 and helps to prevent damage to the electrical wire, such that the battery can be located near the mower blade 24 underneath the mower deck 16. Moreover, the channel 82 can be included within any of the examples, regardless of whether the baffle opening 42 is provided on the baffle 30. In the examples where no baffle opening is provided, a channel 82 can be provided between support surfaces or between various locating protrusions to provide protection for a wire from the grass being cut by the mower blade.

FIG. 3 shows the baffle 30 just before its final installation within the mower deck 16. In this example, a first aperture 90 in the mower deck 16 can be seen. The first aperture 90 is configured to provide a location for the second end 86 of the at least one wire 80 to travel through the mower deck 16 for the second end 86 to reach another destination outside the interior of the mower deck 16, such as an electrical connector, or to the motor 14 of the mower. For example, the at least one wire 80 passes through the first aperture 90 and can then be connected to the motor 14 of the mower which is located on top of the top surface portion 18 of the mower deck 16. The baffle 30 with the battery 52 is in a location that is near the mower blade 24.

Figure 6:
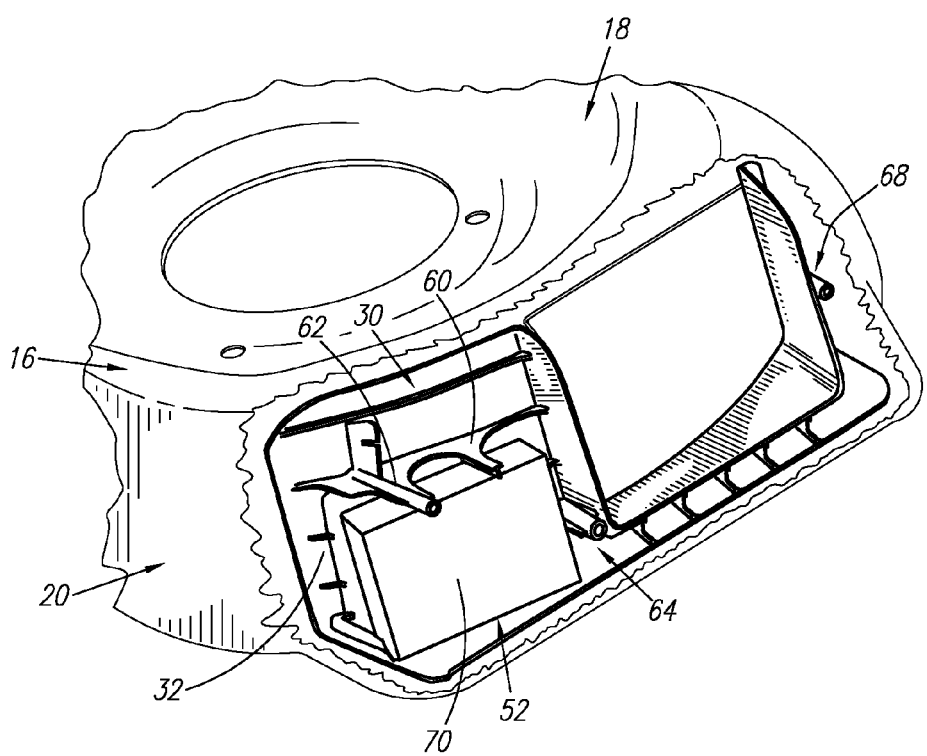
FIG. 6 is a perspective view of a portion of the mower deck, with a segment torn-off to reveal the example baffle of FIG. 4 as it is secured to the mower deck.

FIG. 6 shows a sectional view of the baffle 30 with the battery 52 after it is installed underneath a mower deck 16. Thus, it is appreciated from this drawing that the baffle 30 is secured within the mower deck 16. In this view, the protective element 70 can be in contact with the underside of the mower deck 16 but the outer surface of the mower deck 16 is not visible in this view, so that the baffle 30 and the battery 52 can be seen. The mower deck 16 can include a top surface portion 18 and a side surface portion 20 that extends from a perimeter of the top surface portion 18. For example, the top surface portion 18 can have a circular or quadrilateral shape where the side surface portion 20 is a shroud that extends downwardly from the perimeter of the circular shape of the top surface portion 18. In other examples, other orientations between the top surface portion 18 and the side surface portion 20 can be used as well as other shapes and configurations. In one example, the baffle 30 with the battery 52 is mounted on the side surface portion 20 of the mower deck 16.

In the example of FIG. 6, the fasteners are inserted into the second locating protrusion 62, the third locating protrusion 64, and the first fastener aperture 68 from the interior 22 of the mower deck 16 for securing the baffle 30 to the mower deck 16. Thus, the fasteners may not be visible from the exterior of the mower deck 16.

An example method of installing a battery within a baffle where the baffle is located within an interior of a mower deck can be provided. One step in this example method is to provide a mower deck 16 where the mower deck 16 has a downwardly-open interior within which grass is cut. A battery 52 can be installed within a baffle 30. The baffle 30 can then be secured within the interior of the mower deck 16. The baffle 30 is configured for bounding an area within the mower deck 16 such that at least one side portion, such as the first side portion 54, of the battery 52 is restrained from movement by an underside of the mower deck 16. The example method can further include the step of engaging a protective element 70 on the at least one side portion of the battery 52 wherein the protective element 70 on the at least one side portion of the battery 52 is in contact with the underside of the mower deck 16. The protective element 70 is configured for absorbing vibration of the mower deck 16.

Alternatively, the example method can further include the step of securing a portion of at least one wire 80 extending from the battery 52 into a channel 82 located within the baffle 30. In addition, this example method can further include the step of pulling an end 86 of the at least one wire 80 through the channel 82 and pulling the end 86 of the at least one wire 80 through a first aperture 90 located on the mower deck 16. The end 86 of the at least one wire 80 can then be placed into engagement with an electrical connector, such as with a connector for a motor 14, an engine, or a starter that requires electrical energy.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A mower for cutting grass including:
   a body including a mower deck wherein the mower deck has a downwardly-open interior within which grass is cut, further wherein the mower deck includes a top surface portion and a side surface portion extending from a perimeter of the top surface portion;
   a motor supported upon the mower deck and supplying a motive force for a mowing operation wherein the motor includes at least a portion operable by electrical energy;
   a baffle located within the interior of the mower deck wherein the baffle bounds an area within the mower deck, further wherein the baffle includes a baffle opening and is mounted underneath the side surface portion of the mower deck;
   a discharge opening configured to transport the grass that is cut from the mower wherein the discharge opening is located on the side surface portion of the mower deck;
   wherein the baffle opening corresponds to a location of the discharge opening of the mower deck; and
   a battery located within the interior of the mower deck and located within the area bounded by the baffle.

2. A mower according to claim 1, further including a protective element engaging at least a side portion of the battery wherein the protective element is configured for absorbing vibration.

3. A mower according to claim 2, wherein the protective element is further in contact with the mower deck.

4. A mower according to claim 1, further including at least two support surfaces located on the baffle that includes a first support surface and a second support surface;
   wherein the battery is placed on the first support surface of the baffle;
   wherein the second support surface extends at an angle relative to the first support surface of the baffle; and
   wherein the second support surface contacts at least one of the side portions of the battery and wherein the first support surface and the second support surface are configured for substantially restraining the movement of at least one of the side portions of the battery.

5. A mower according to claim 1,
   wherein the baffle includes at least one opening flange on at least one side of a perimeter of the baffle opening.

6. A mower according to claim 5, wherein a thickness of the battery as measured between a first side portion of the battery and a second side portion of the battery is relatively less than a depth of the at least one opening flange.

7. A mower according to claim 5, further including:
   at least one support surface located on the baffle;
   at least one wire extending from the battery;
   a channel located between the at least one opening flange and the at least one support surface of the baffle; and
   wherein the channel is configured to secure a portion of the at least one wire.

8. A mower according to claim 7, wherein the at least one wire extends from the battery, through the channel, and through a first aperture located in the mower deck to reach an electrical connector.

9. A mower according to claim 1, wherein the battery includes a first side portion, a second side portion opposite the first side portion, and at least a third side portion extending between the first side portion and the second side portion;
   wherein the second side portion of the battery engages the baffle; and
   wherein an underside of the mower deck is configured for substantially restraining the movement of the first side portion of the battery.

10. A mower according to claim 1, further including at least one locating protrusion located on the baffle wherein the at least one locating protrusion contacts at least a side portion of the battery and wherein the at least one locating protrusion is configured for substantially restraining the movement of at least one side portion of the battery.

11. A mower according to claim 10, wherein at least one of the locating protrusions is configured to receive a fastener for securing the baffle to the mower deck.

12. A mower for cutting grass including:
    a body including a mower deck wherein the mower deck has a downwardly-open interior within which grass is cut wherein the mower deck includes a top surface portion and a side surface portion that extends from a perimeter of the top surface portion, further wherein the mower deck includes a discharge opening configured to transport the grass from the mower deck, the discharge opening being located on the side surface portion of the mower deck;
    a motor supported upon the mower deck and supplying a motive force for a mowing operation wherein the motor includes at least a portion operable by electrical energy;
    a baffle mounted underneath the side surface portion of the mower deck within the interior of the mower deck wherein the baffle bounds an area within the mower deck, further wherein the baffle includes a baffle opening configured to correspond to a location of the discharge opening;
    a battery located within the interior of the mower deck and located within the area bounded by the baffle; wherein the battery includes a first side portion, a second side portion opposite the first side portion, and at least a third side portion extending between the first side portion and the second side portion;
    wherein the second side portion of the battery is placed on a first support surface of the baffle; and
    wherein the mower deck is configured for substantially restraining the movement of the first side portion of the battery.

13. A mower according to claim 12, further including a protective element engaging the first side portion of the battery wherein the protective element is in contact with the mower deck and the protective element is configured for absorbing vibration.

14. A mower according to claim 12, further including a second support surface located on the baffle;
    wherein the second support surface extends at an angle relative to the first support surface of the baffle; and
    wherein the second support surface contacts at least the third side portion of the battery and wherein the second support surface is configured for substantially restraining the movement of at least the third side portion of the battery.

15. A mower according to claim 12, further including
    at least one opening flange on at least one side of a perimeter of the baffle opening.

16. A mower according to claim 15, wherein a thickness of the battery as measured between the first side portion of the battery and the second side portion of the battery is relatively less than a depth of the at least one opening flange.

17. A mower according to claim 12, further including
    at least one wire extending from the battery;

a channel located within the baffle; and wherein the channel is configured to secure a portion of the at least one wire.

18. A mower according to claim 17, wherein the at least one wire extends from the battery, through the channel, and through a first aperture located in the mower deck to reach an electrical connector.

19. A mower according to claim 15, further including:

at least one support surface located on the baffle;

at least one wire extending from the battery;

a channel located between the at least one opening flange and the at least one support surface of the baffle; and wherein the channel is configured to secure a portion of the at least one wire.

20. A mower according to claim 12, further including at least one locating protrusion located on the baffle wherein the at least one locating protrusion contacts at least a side portion of the battery and wherein the at least one locating protrusion is configured for substantially restraining the movement of at least one side portion of the battery.

21. A mower according to claim 20, wherein at least one of the locating protrusions is configured to receive a fastener for securing the baffle to the mower deck.

22. A method of installing a battery within a baffle where the baffle is located within an interior of a mower deck including:

providing the mower deck wherein the mower deck has a downwardly-open interior within which grass is cut;

installing the battery within the baffle including a baffle opening; and securing the baffle within the interior of the mower deck and adjacent to a discharge opening in the mower deck through which cut grass is transported from the interior of the mower deck, wherein the baffle is configured for bounding an area within the mower deck such that at least one side portion of the battery is restrained from movement by an underside of the mower deck, and wherein the baffle opening corresponds to a location of the discharge opening of the mower deck.

23. A method according to claim 22, further including engaging a protective element on the at least one side portion of the battery wherein the protective element on the at least one side portion of the battery is in contact with the underside of the mower deck.

24. A method according to claim 22, further including securing a portion of at least one wire extending from the battery in a channel located within the baffle.

25. A method according to claim 24, further including pulling an end of the at least one wire through the channel and pulling the end of the at least one wire through a first aperture located on the mower deck wherein the end of the at least one wire is placed into engagement with an electrical connector.

* * * * *